United States Patent
Fuwa (10) Patent No.: US 6,832,149 B2
(45) Date of Patent: Dec. 14, 2004

(54) SLIDING MODE CONTROLLING APPARATUS AND SLIDING MODE CONTROLLING METHOD

(75) Inventor: Toshio Fuwa, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 180 days.

(21) Appl. No.: 10/279,837

(22) Filed: Oct. 25, 2002

(65) Prior Publication Data

US 2003/0083799 A1 May 1, 2003

(30) Foreign Application Priority Data

Oct. 30, 2001 (JP) ........................................ 2001-332597

(51) Int. Cl.⁷ ............................ F01L 1/34; G05B 13/00
(52) U.S. Cl. ...................... 701/102; 700/30; 123/90.11
(58) Field of Search ................................ 701/102, 103, 701/105; 123/90.11, 90.15, 90.17, 90.31; 700/30

(56) References Cited

U.S. PATENT DOCUMENTS

| | | | | |
|---|---|---|---|---|
| 4,178,037 A | * | 12/1979 | Pickles | ........................ 297/326 |
| 6,047,521 A | * | 4/2000 | Terminella et al. | ........ 53/133.4 |
| 6,431,131 B1 | | 8/2002 | Hosoya et al. | ........... 123/90.15 |
| 2002/0014948 A1 | * | 2/2002 | Okumura et al. | ........... 338/176 |
| 2003/0188488 A1 | * | 10/2003 | Carlsson et al. | .............. 49/118 |

FOREIGN PATENT DOCUMENTS

| | | |
|---|---|---|
| DE | 100 54 600 A 1 | 6/2001 |
| EP | 0 494 500 A1 | 7/1992 |
| EP | 0 800 125 A1 | 10/1997 |
| JP | A 9-217859 | 8/1997 |

OTHER PUBLICATIONS

"Electromagnetic Engine Valve Actuator with Low Seating Velocity", Research Disclosure, No. 352, Emsworth, GB, Aug. 1993.

* cited by examiner

*Primary Examiner*—Hieu T. Vo
(74) *Attorney, Agent, or Firm*—Oliff & Berridge, PLC (57) ABSTRACT

A valve of an internal combustion engine includes a valve body movable between a fully opened position and a fully closed position, an armature coupled to the valve body, a pair of springs urging the valve body, and a pair of electromagnets. Each electromagnet generates electromagnetic force to attract the armature, thereby moving the valve body. The engine valve is controlled by means of sliding mode. That is, when the valve body is moved from the fully closed position to the fully opened position, the electromagnets are controlled such that the state quantity of the valve body (the position and the moving speed) converges on a previously set switching hyperplane. The switching hyperplane is changed in accordance with the position of the valve body. As a result, a number of factors required for controlling the engine valve are satisfied.

23 Claims, 9 Drawing Sheets

Fig.5(b)
(Region A)

Fig.5(c)
(Region B)

SLIDING MODE CONTROLLING APPARATUS AND SLIDING MODE CONTROLLING METHOD

BACKGROUND OF THE INVENTION

The present invention relates to a sliding mode controlling apparatus and a sliding mode controlling method for controlling the behavior of an elastic system, such as a spring-mass system.

For example, Japanese Laid-Open Patent Publication No. 9-217859 discloses a control system having a spring-mass system such as an electromagnetic valve. In such a control system, the state quantity, which includes, for example, the moved amount and the moving speed of a controlled subject, is feedback controlled through, for example, Proportional, Integral, Derivative (PID) control, such that the state quantity follows a target state quantity. However, the robustness of the prior art controlling methods, such as PID control, cannot be reliably maintained against disturbances and changes in characteristics of the controlled subject.

Accordingly, sliding mode control has been applied to such control systems. In the sliding mode control, the state quantity of a controlled subject converges on a switching hyperplane represented by a favorably designed linear function. Also, the state quantity is prevented from leaving the switching hyperplane.

Therefore, the sliding mode control guarantees a sufficient robustness against disturbances and changes in characteristics of the controlled subject and also prevents the state quantity of the controlled subject from leaving the switching hyperplane.

When the control performance of the sliding mode control is determined for controlling a subject, a switching hyperplane needs to designed to match several requirements. In this case, the requirements can contradict one another.

For example, in the control of the electromagnetic valve disclosed in the above publication, not only a stable operation, but also reduction of power consumption and prevention of noise produced by the action of the valve body are important factors that must be taken into consideration when determining the performance of the valve. If the sliding mode control is applied to the prevention of noise produced by opening and closing of the valve body, the switching hyperplane will be typically designed as follows. That is, the switching hyperplane is designed such that, when the valve body, which is the controlled subject, is moved from a first end of movement to a second end of movement, the moving speed of the valve body is decreased immediately before the valve body reaches the second end of movement. However, such design of the switching hyperplane will extend the time required for the valve body to move from the first movement end to the second movement end.

In this manner, when the switching hyperplane of sliding mode control is designed, several factors are often considered for improving the control performance. However, the required factors also often contradict one another. The contradictions of the required factors significantly hinder improvement of the control performance.

SUMMARY OF THE INVENTION

Accordingly, it is an objective of the present invention to provide a sliding mode controlling apparatus and a sliding mode controlling method that satisfy two or more requirements without contradiction when controlling the behavior of an elastic system such as spring mass system.

To achieve the foregoing and other objectives and in accordance with the purpose of the present invention, a sliding mode controlling apparatus for a controlled subject urged by an elastic member is provided. The controlled subject is movable between two movement ends. When the controlled subject is moved from a first movement end, which is one of the movement ends, to a second movement end, which is the other one of the movement ends, the controlling apparatus controls the controlled subject such that the state quantity of the controlled subject converges on a previously set switching hyperplane. The controlling apparatus includes changing means, which changes the switching hyperplane in accordance with the position of the controlled subject.

The present invention may also be applied to a sliding mode control method for a controlled subject urged by an elastic member. The controlled subject is movable between two movement ends. The method includes: controlling the controlled subject such that the state quantity of the controlled subject converges on a previously set switching hyper plane when the controlled subject is moved from a first movement end, which is one of the movement ends, to a second movement end, which is the other one of the movement ends; and changing the switching hyperplane in accordance with the position of the controlled subject.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 5($a$) to 5($c$) are graphs for setting a switching hyperplane according to a second embodiment, in which a sliding mode controlling apparatus according to the present invention is applied to a valve controlling apparatus of an engine;

FIGS. 10($a$) to 10($c$) are time charts showing control of an exhaust valve according to a fourth embodiment, in which a sliding mode controlling apparatus according to the present invention is applied to a valve controlling apparatus of an engine;

FIGS. 12(a) to 12(c) are time charts showing control of an exhaust valve according to a modification of the fourth embodiment;

FIGS. 13(a) to 13(c) are time charts showing control of an exhaust valve according to another modification of the fourth embodiment.

DETAILED DESCRIPTION OF THE PREFERRED EMBODIMENTS

A sliding mode controlling apparatus according to a first embodiment of the present invention will now be described. The sliding mode controlling apparatus is applied to a controlling apparatus of an electromagnetic engine valve.

Since the intake valve and the exhaust valve basically have the same structure and are controlled in the same way, the exhaust valve will mainly be described in this embodiment.

The exhaust valve, which is a controlled subject, has a first elastic member and a second elastic member. The first elastic member urges a valve body toward a first end of movement. The second elastic member urges the valve body toward a second end of movement. An armature is coupled to the valve body. Electromagnetic force is applied to the armature such that the valve body is selectively attracted to the first movement end and the second movement end.

Figure 1:
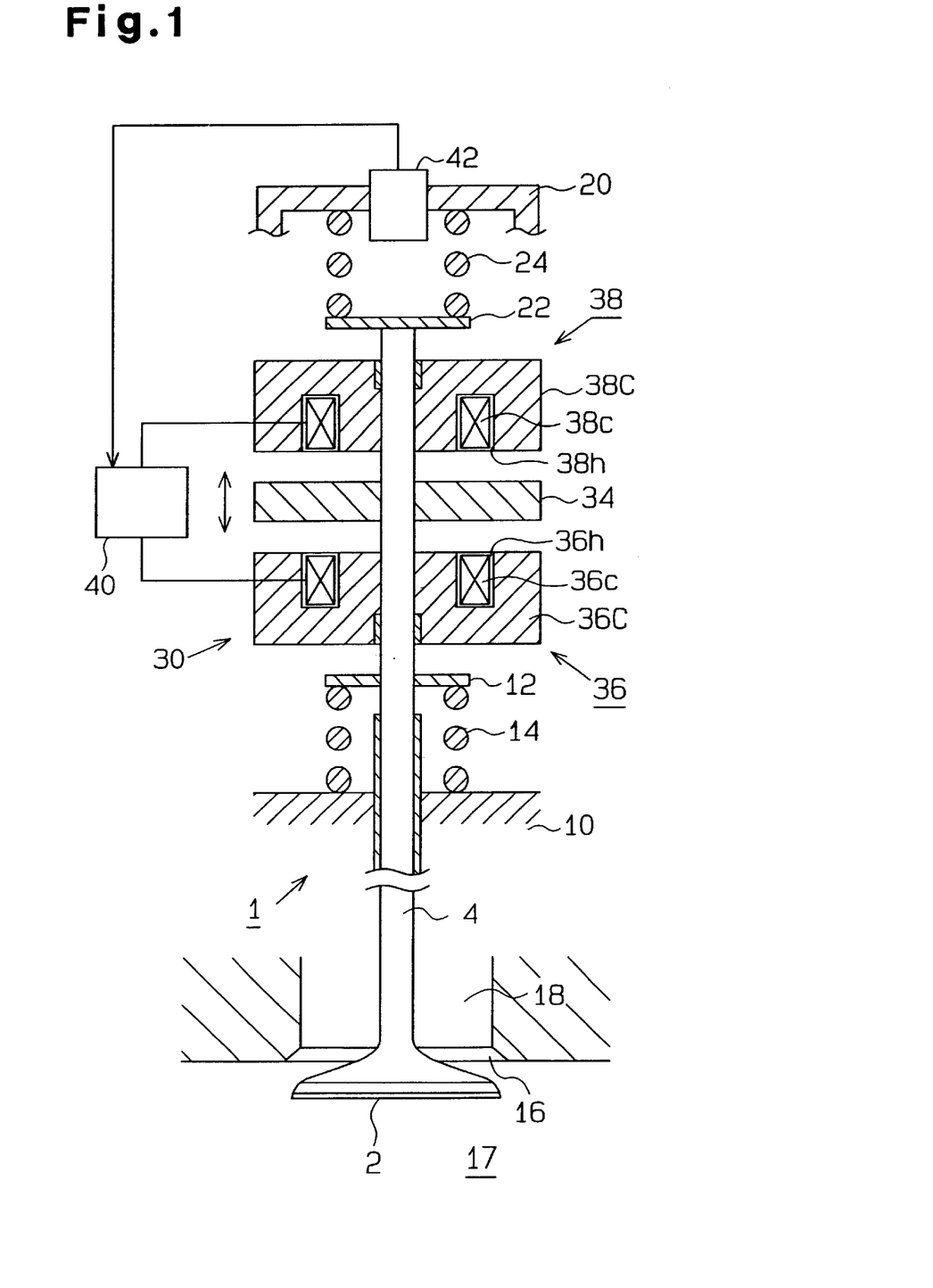
FIG. 1 is a cross-sectional view illustrating a sliding mode controlling apparatus according to a first embodiment applied to a valve controlling apparatus of an engine.

Specifically, as shown in FIG. 1, the exhaust valve 1 includes a valve shaft 4, a valve body 2 located at one end of the valve shaft 4, a lower spring 14 corresponding to the first elastic member, an upper spring 24 corresponding to the second elastic member, and an electromagnetic actuator 30 for reciprocating the valve shaft 4 in a cylinder head 10.

An exhaust port 18 is formed in the cylinder head 10. The exhaust port 18 communicates with a combustion chamber 17. A valve seat 16 is formed at the opening of the exhaust port 18. The valve body 2 is received by the valve seat 16. That is, as the valve shaft 4 reciprocates, the valve body 2 separates from and contacts the valve seat 16, which opens and closes the exhaust port 18.

A lower retainer 12 is attached to the valve shaft 4 at a position opposite of the combustion chamber 17 with respect to the cylinder head 10. The lower spring 14 is located between the lower retainer 12 and the cylinder head 10. The valve body 2 is urged in a valve closing direction by the elastic force (urging force) of the lower spring 14.

An upper retainer 22 is attached to an end of the valve shaft 4 opposite from the end of the valve body 2. An upper cap 20 is located in a casing (not shown) of the electromagnetic actuator 30. The upper spring 24 is located between the upper retainer 22 and the upper cap 20 in a compressed state. The valve body 2 is urged in a valve opening direction by the elastic force (urging force) of the upper spring 24.

The electromagnetic actuator 30 includes an armature 34, a lower core 36C and an upper core 38C. The armature 34 is fixed to the valve shaft 4. The lower core 36C and the upper core 38C are on opposite sides of the armature 34. The armature 34 is a disk made of a high permeability material. The lower core 36C and the upper core 38C each have an annular member made of a high permeability material. The annular members receive the valve shaft 4 at the center and permit the valve shaft 4 to be reciprocated relative to the annular members.

An annular groove 36h is formed in a side of the lower core 36C facing the armature 34. The axis of the groove 36h coincides with the axis of the valve shaft 4. An annular lower coil 36c is located in the groove 36h. The lower coil 36c and the lower core 36C form an opening electromagnet 36 for moving the valve body 2 in the opening direction.

An annular groove 38h is formed in a side of the upper core 38C facing the armature 34. The axis of the groove 38h coincides with the axis of the valve shaft 4. An annular upper coil 38c is located in the groove 38h. The upper coil 38c and the upper core 38C form a closing electromagnet 38 for moving the valve body 2 in the closing direction.

FIG. 1 shows a state in which no electromagnetic force is produced in either of the electromagnet 36 or 38. In this state, the armature 34 is not attracted by the electromagnets 36, 38. The armature 34 therefore stays at a position where the urging forces of the springs 14 and 24 are balanced. That is, the armature 34 is located substantially at a midpoint between the lower core 36C and the upper core 38C. The position of the valve body 2 shown in FIG. 1 is defined as a reference position.

When electromagnetic force generated by either of the electromagnets 36, 38 is applied to the armature 34, the armature 34 is attracted to the lower core 36C or the upper core 38C. The electromagnetic force is generated by supplying current to the coils 36c, 38c of the electromagnets 36, 38.

In this embodiment, currents to the coils 36c, 38c of the electromagnets 36, 38 are controlled based on the amount of movement (moved position) of the exhaust valve 1 (the valve body 2 and the valve shaft 4). Specifically, the engine valve controlling apparatus of this embodiment has a displaced amount sensor 42, or a position sensor 42, located in the upper cap 20. The displacement amount sensor 42 outputs a voltage (detection signal) the level of which corresponds to the distance between the sensor 42 and the upper retainer 22. Based on the voltage, the sensor 42 detects the moved position of the valve body 2, or the moved amount (displaced amount) of the valve body 2 relative to the reference position. The above current control is executed based on the moved position of the discharge valve 1 by using the detection result of the displaced amount sensor 42.

The current control is performed by an electronic control unit 40 (hereinafter referred to as ECU 40), which performs various controls of the entire engine system. The ECU 40, which is a controller, includes a CPU, a memory, a driver, an input circuit, and an A/D converter (none of which is shown). The driver supplies current to the coils 36c, 38c of the electromagnets 36, 38. The input circuit receives detection signals form the displacement amount sensor 42. The A/D converter converts the received detection signals from analog to digital.

The operation of the exhaust valve 1 will now be described. The ECU 40 controls current to the exhaust valve 1 thereby opening and closing the exhaust valve 1.

When the exhaust valve 1 is closed, retaining current is supplied to the closing electromagnet 38 to retain the exhaust valve 1 at the fully closed position, in other words, to retain the valve body 2 contacting the valve seat 16. The retraining current causes the closing electromagnet 38 to generate electromagnetic force that attracts the armature 34 toward the upper core 38. Accordingly, the valve body 2 contacts the valve seat 16 against the force of the upper spring 24, and the armature 34 is held contacting the upper core 38C.

When a time at which the exhaust valve 1 needs to be opened arrives, the retaining current is stopped. This permits the elastic force of the upper spring 24 to open the exhaust valve 1. In other words, the armature 34 is moved toward the lower core 36C, and the valve body 2 separates from the valve seat 16 and moves toward the combustion chamber 17.

When the exhaust valve 1 is being moved from the fully closed position to the fully opened position, current to the opening electromagnet 36 is controlled. When the armature 34 contacts the lower core 36C, the exhaust valve 1 reaches the fully opened position. In this state, retaining current is supplied to the opening electromagnet 36 to maintain this state. The retraining current causes the opening electromagnet 36 to generate electromagnetic force that attracts the armature 34 toward the lower core 36C. Accordingly, the valve body 2 is held at the fully opened position against the force of the lower spring. 14.

When a time at which the exhaust valve 1 needs to be closed arrives, the retaining current for retaining the exhaust valve 1 at the fully opened position is stopped. The force of the lower spring 14 moves the exhaust valve 1 in the valve closing direction. In other words, the valve body 2 is moved toward the valve seat 16.

When the exhaust valve 1 is being moved from the fully opened position to the fully closed position, current to the closing electromagnet 38 is controlled. When the valve body 2 contacts the valve seat 16, or reaches the fully closed position, retaining current to maintain this state is supplied to the closing electromagnet 38.

In this embodiment, when the valve body 2 is moved from one end of movement to the other end of the movement in this manner, currents to the electromagnets 36, 38 are controlled by means of sliding mode control as described below. In the movement from the fully closed position to the fully opened position and in the movement from the fully opened position to the fully closed position, the electromagnets 36, 38 are controlled in the same manner. Therefore, the movement from the fully closed position to the fully opened position will be mainly discussed below.

In this embodiment, the valve body 2, which is the controlled subject, is moved in a one-dimensional space (a line segment) between the fully closed position and the fully opened position. The state quantity that represents the dynamic properties of the valve body 2 includes the moved position and the moving speed of the valve body 2. The electromagnetic actuator 30 is controlled such that, in a two-dimensional linear space the degrees of freedom of which are the moved position and the moving speed of the valve body 2, the moved position and the moving speed, or the state quantity, of the valve body 2 converge to a predetermined switching hyperplane that is previously set as a linear subspace in the two-dimensional linear space. The switching hyperplane is varied in accordance with the moved position of the valve body 2, thereby satisfying several requirements regarding the control property of the engine valve.

Specifically, a reference model that represents transition of the state quantity (moved position and the moving speed) of the valve body 2 is defined. The state quantity of the valve body 2 is determined by the urging forces of the upper spring 24 and the lower spring 14. As discussed below, the reference model is defined as a quadratic curve except for a specific portion. A hyperplane that contacts a portion of the reference model that corresponds to a given moved position of the valve body 2 is set as the switching hyperplane. The reference model is set based on a transition of the state quantity of the valve body 2, which transition is estimated on the supposition that there is no disturbance, factors limiting movement of the valve body 2 (for example, frictional force), or electromagnetic force. In the vicinity of the second end of movement, which corresponds to the fully opened position of the valve body 2 in this embodiment, the reference model is not represented by a quadratic curve, but is represented by a linear function, or a one-dimensional hyperplane. That is, the reference model of this embodiment includes a quadratic reference model section and a linear reference model section. The quadratic reference model section is represented by a quadratic curve indicating transitions of the state quantity of the valve body 2 that are defined only by the urging forces of the upper spring 24 and the lower spring 14. The linear reference model section is represented by a straight line of a linear function.

The linear reference model section corresponds to a movement region of the valve body 2 in the vicinity of the fully opened position, that is, to a movement region of the valve body 2 between the fully opened position and a position spaced from the fully opened position by a predetermined distance. In the linear reference model section, the moving speed of the valve body 2 at the fully opened position is set at zero. In the movement region of the valve body 2 that corresponds to the linear reference model section, the rate of change of moving speed of the valve body 2 represented by the linear reference model section is smaller than the rate of moving speed of the valve body 2 that is defined only by the urging forces of the upper spring 24 and the lower spring 14. In other words, the switching hyperplane at the fully opened position of the valve body 2 is set as a hyperplane that sets the moving speed of the valve body 2 at the fully opened position at zero, and makes the rate of change of moving speed of the valve body 2 in the vicinity of the fully opened position smaller than the rate of change of moving speed of the valve body 2 that is defined only by the urging forces of the upper spring and the lower spring 24, 14.

Figure 2:
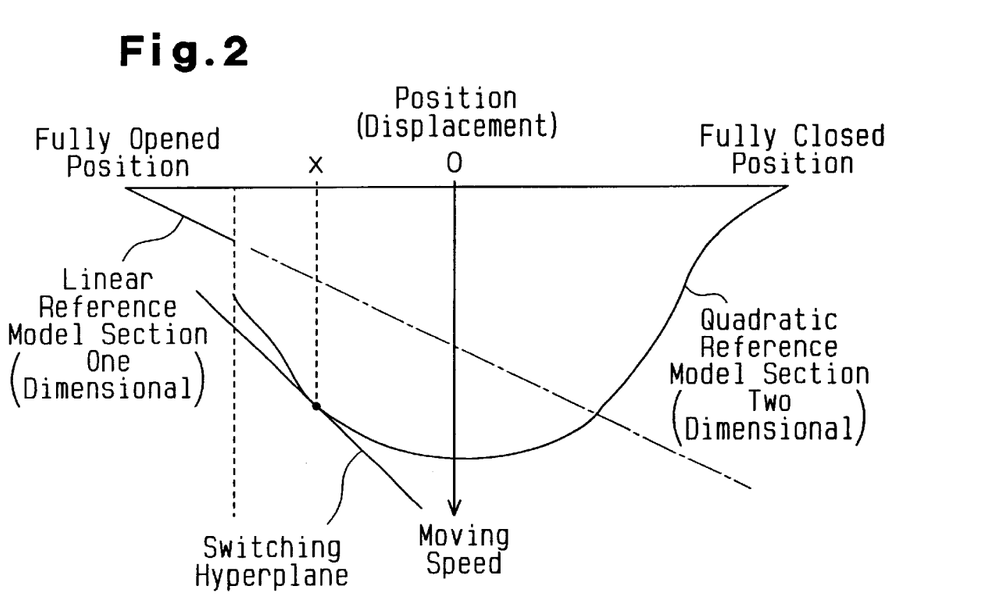
FIG. 2 is a graph showing the switching hyperplane of the controlling apparatus according to the first embodiment.

FIG. 2 shows a procedure to establish the switching hyperplane of this embodiment. As shown in FIG. 2, the quadratic reference model section, which corresponds to the movement range exclusive of the vicinity of the fully closed position, is set in the following manner. That is, the quadratic reference model section is represented by a quadratic curve that indicates the relationship between the moved position and the moving speed of the valve body 2 when the valve body 2 is moved from the fully closed position toward the fully opened position by only the urging forces of the upper spring 24 and the lower spring 14. In the graph of FIG. 2, zero in the horizontal axis represents the reference position of the valve body 2.

The quadratic curve defined by the quadratic reference model section is computed based on a physical model (reference physical model) in which physical systems are an elastic body including the lower spring 14 and the upper spring 24 and a movable member including the exhaust valve coupled to the elastic body. If the weight of the movable member, the elastic coefficient of the elastic body, and the moved amount (displaced amount) of the valve body 2 with reference to the reference position are represented by M, K and x, respectively, the dynamic equation of the reference physical system is expressed by the following equation (c1).

$$M \cdot \ddot{x} = -K \cdot x \quad (c1) \qquad \text{(Equation 1)}$$

The displaced amount x, which is the solution of the equation (c1), is obtained as a periodic function. The moving speed (displacement speed), which is a differential value of the displaced amount x, is also obtained as a periodic function. The relationship between the displaced amount and the displacement speed is represented by the quadratic curve shown in FIG. 2.

As shown in FIG. 2, the linear reference model section that corresponds to the movement region of the valve body 2 in the vicinity of the fully opened position is represented by a straight line of a linear function, in other words, a one-dimensional hyperplane. If the quadratic curve is set to correspond to the movement region of the valve body 2 in the vicinity of the fully opened position, in this movement region, the rate of change of moving speed of the valve body 2 represented by the linear reference model section is smaller than the rate of change of moving speed of the valve body 2 represented by the quadratic reference model section.

Based on the reference model, which includes the linear and quadratic reference model sections, the above described switching hyperplane is set in accordance with the moved position (displaced amount) of the valve body 2. As a result, the factors required in the control of the exhaust valve 1 are satisfied. That is, except for the vicinity of the fully opened position, the actual state of movement of the valve body 2 is controlled to follow the state of movement of the valve body 2 that is obtained when the valve body 2 is moved only by the urging force of the elastic body. Accordingly, the valve body 2 is moved by utilizing the natural vibration of the physical system, which includes the exhaust valve 1. As a result, the time required for moving the valve body 2 from the fully closed position to the fully opened position is shortened.

Contrarily, in the vicinity of the fully opened position, the state quantity is prevented from leaving the hyperplane where the rate of change of moving speed is relatively small. Thus, the shock generated when the armature 34 contacts the upper face of the lower core 36C is reduced.

In this manner, the exhaust valve 1 is controlled such that the state quantity of the valve body 2 is prevented from leaving the switching hyperplane, which is variable in accordance with the moved position of the valve body 2. This not only shortens the time required for the valve body 2 to move, but also reduces the shock generated when the armature 34 contacts the lower core 36C. Contrarily, if the exhaust valve 1 is controlled by using a switching hyperplane shown by dashed line in FIG. 2 to reduce the shock of contact, the time required for the valve body 2 to move will be extended.

To realize the sliding mode control, in which the state quantity of the valve body 2 is prevented from leaving the switching hyperplane, the current to the exhaust valve 1 is controlled in the following manner.

First, a switching hyperplane contacting a portion of the quadratic reference model section, which corresponds to the displaced amount x of the valve body 2 (represented by the tangent to the quadratic reference model section in FIG. 2), and the linear reference model section are defined by the following equation (c2).

$$\dot{x} = a \cdot x + b \quad \text{(c2)} \qquad \text{(Equation 2)}$$

In the equation (c2), coefficients a, b are functions of displaced amount x of the valve body 2. A switching function σ, which is a linear function defining a switching hyperplane, is defined by the following equation (c3).

$$\sigma = \dot{x} - a \cdot x - b \quad \text{(c3)} \qquad \text{(Equation 3)}$$

As obvious in the equation (c3), a hyperplane in which the switching function σ is zero is the switching hyperplane.

In addition to the elastic body including the lower spring 14 and the upper spring 24, and the movable member including the exhaust valve 1 connected to the elastic body, the actual physical system is considered to include the sliding resistance between the movable member and a stationary member supporting the movable member, and the electromagnetic force applied to the armature 34. The dynamic equation is expressed by the following equation (c4), in which the weight is represented by M, the elastic coefficient is represented by K, the displaced amount is represented by x, the attenuation coefficient is expressed by C, and a sliding mode input is represented by Ul. The attenuation coefficient C represents the frictional resistance between the movable member and the stationary member. The sliding mode input Ul represents the electromagnetic force applied to the armature 34 in the sliding mode state.

$$M \cdot \ddot{x} = -K \cdot x - C \cdot \dot{x} + Ul \quad \text{(c4)} \qquad \text{(Equation 4)}$$

In the sliding mode state, the state quantity of the exhaust valve 1 is prevented from leaving the switching hyperplane, in other words, a hyperplane where the switching function σ is zero. Therefore, the sliding mode input Ul is expressed by the following equation (c5) based on the dynamic equation (c4) and the fact that the time differential of the switching function σ is zero.

$$Ul = (C + M \cdot a) \cdot \dot{x} + K \cdot x \quad \text{(c5)} \qquad \text{(Equation 5)}$$

Also, when the state quantity of the exhaust valve 1 leaves the switching hyperplane, the state quantity is converged on the switching hyperplane by means of an reaching mode input (feedback input) Unl. The reaching mode input Unl is expressed by the following equation (c6).

(Equation 6)
$$Unl = G \cdot \frac{\sigma}{|\sigma|} \qquad \text{(c6)}$$

In the equation (c6), G represents a feedback gain and is determined to satisfy a reaching condition. The reaching condition refers to a condition for the state quantity of the exhaust valve 1 to reach the switching hyperplane, in other words, a condition for the state quantity of the exhaust valve 1 to follow the sliding mode. The gain G that satisfies the reaching condition is set by means of Liapunov function method in this embodiment. That is, for example, an equation V=1/2×σ×σT is set as a Liapunov function V, and the gain G is determined such that the time differential represented by the following equation (c7) has a negative value.

$$\dot{V} = \sigma^T \cdot \dot{\sigma} \quad \text{(c7)} \qquad \text{(Equation 7)}$$

In the equation (c7), the gain G is determined such that the time differential of the Liapunov function V has a negative value. This permits the switching function σ to be converged on zero by using the reaching mode input Unl.

Figure 4:
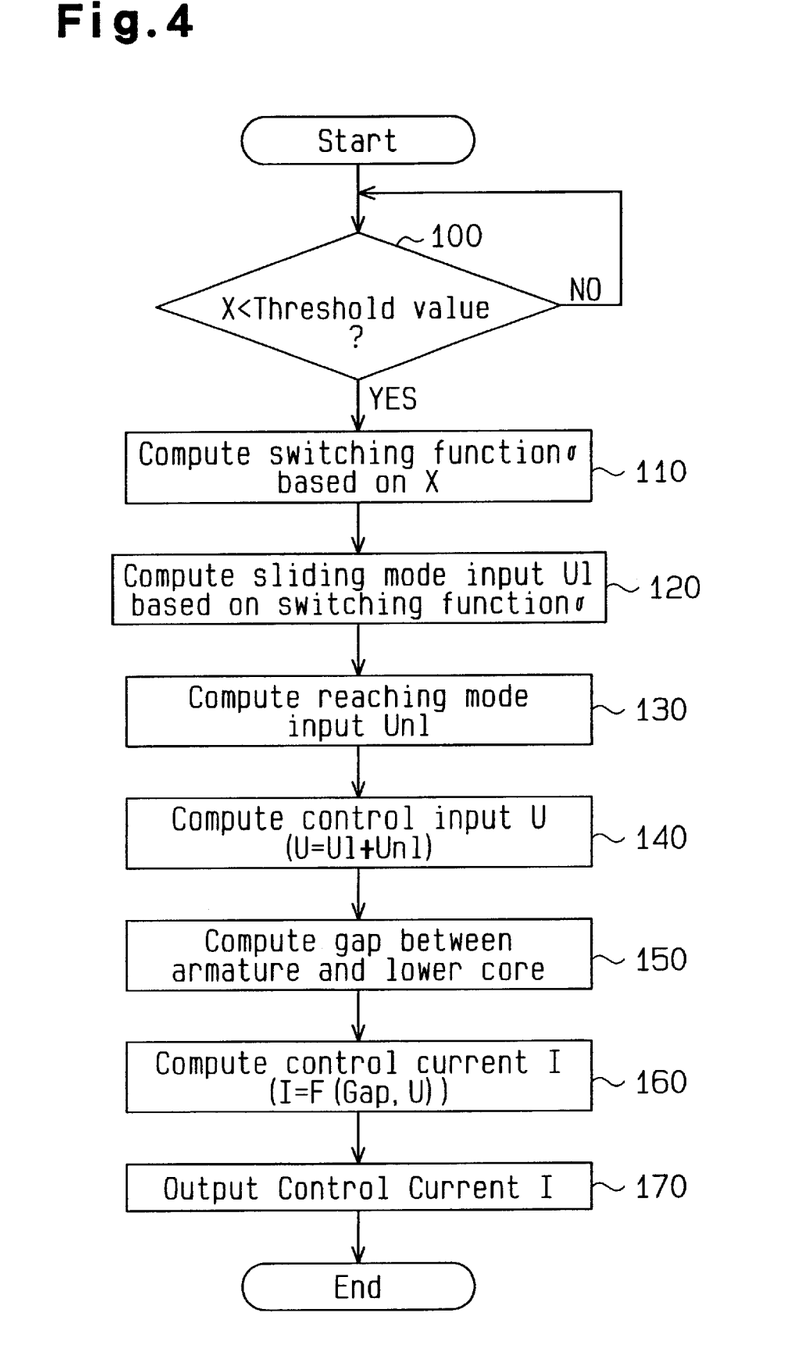
FIG. 4 is a flowchart showing a procedure for controlling the exhaust valve according to the first embodiment.

The procedure fore controlling the exhaust valve 1 will now be described with reference to FIG. 4. FIG. 4 is a flowchart showing the procedure. The procedure is repeatedly executed at a predetermined time interval.

In step 100, the ECU 40 determines whether the displaced amount x of the valve body 2 is less than a predetermined threshold value. If the outcome is positive, the ECU 40 proceeds to step 110. The threshold value is determined such that, for example, the attraction force applied to the armature 34 by the opening electromagnet 36 is equal to or greater than a predetermined value.

In step 110, the ECU 40 computes the switching function σ based on the displaced amount x of the valve body 2 detected by the displaced amount sensor 42. To execute step 110, the ECU 40 previously stores the reference model shown in FIG. 2 and computes the tangent to a portion of the reference model that corresponds to the displaced amount x of the valve body 2. Alternatively, the ECU 40 may have a storing function to store data (for example, a map) related to the switching function σ, such as the coefficients a and b of the equation (c3), which correspond to the displaced amount x of the valve body 2.

Based on the computed switching function σ, the ECU 40 computes the sliding mode input Ul in step 120. Specifically, the ECU 40 computes the sliding mode input Ul by using the equation (c5) based on the switching function a that corresponds to the displaced amount x. In step 130, the ECU 40 computes the reaching mode input Unl by using the equation (c6) based on the switching function σ that corresponds to the displaced amount x.

Based on the sliding mode input Ul and the reaching mode input Unl, the ECU 40 computes the control input U, which is electromagnetic force applied to the armature 34, in step 140. In step 150, the ECU 40 computes the gap between the armature 34 and the lower core 36C based on the displaced amount x detected by the displaced amount sensor 42. In step 160, the ECU 40 computes a control current I supplied to the exhaust valve 1 by using the gap and the control input U. The control current I is computed in the following manner.

That is, the control current I is computed by providing the ECU 40 with a function to store a physical model equation that defines the relationship of the control current I with the gap and the control input U. The electromagnetic force applied to the armature 34 is determined based on the gap between the armature 34 and the lower core 36C and the value of current supplied to the opening electromagnet 36. Therefore, a physical model equation for defining the relationship of the amount of the current (control current I) supplied to the electromagnet 36 with the gap and the electromagnetic force (the control input U) is obtained.

Figure 3:
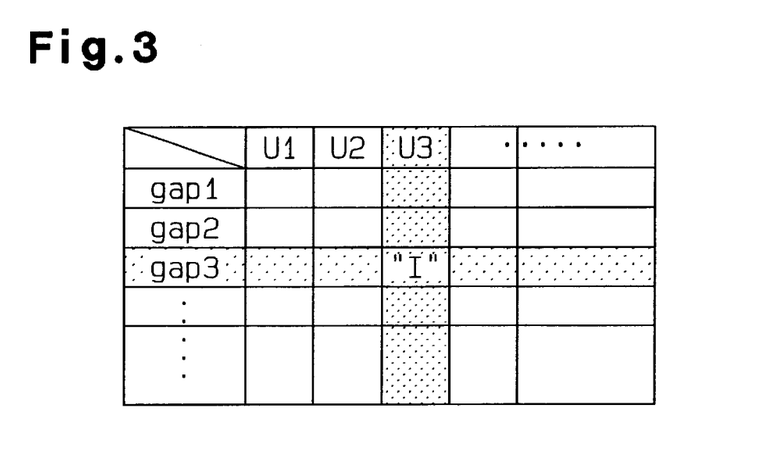
FIG. 3 is a map showing the relationship of a current with a gap and a control input.

The ECU 40 may store a map as shown in FIG. 3, which defines the relationship of the control current I with the gap (gap 1, gap 2, . . . ) and the electromagnetic force (U1, U2, . . . ). When the control input U has a negative value, a force directed in the fully closing direction needs to be applied to the armature 34. However, in the normal state, the opening electromagnet 36 applies a force directed to the fully opening direction to the armature 34. Therefore, when the control input U has a negative value, the control current I is set to zero.

In step 170, the control current I is supplied to the exhaust valve 1.

The above described embodiment has the following advantages.

(1) The switching hyperplane is changed in accordance with the displaced amount (moved position) of the valve body 2. Therefore, number of requirements regarding the control of the exhaust valve 1 are satisfied.

(2) The reference model (quadratic reference model section) is set based on movement of the valve body 2 on the assumption that only the urging forces of the upper spring 24 and the lower spring 14 act on the valve body 2. A hyperplane that contacts a portion of the reference model that corresponds to a given moved position of the valve body 2 is set as the switching hyperplane corresponding to the given moved position. Accordingly, the exhaust valve 1 is controlled by utilizing the natural vibration, which is defined by the weight of the elastic body including the upper spring 24 and the lower spring 14 and the weight of the movable member. This shortens the time required for the valve body 2 to move.

(3) The section of the reference model that corresponds to the fully opened position of the valve body 2, or the linear reference model section, is set as a switching hyperplane that sets the moving speed of the valve body 2 at the fully opened position at zero, and makes the rate of change of moving speed of the valve body 2 in the vicinity of the fully opened position smaller than the rate of change of moving speed of the valve body 2 that is defined only by the urging forces of the upper spring 24 and the lower springs 14. This reduces the shock generated when the armature 34 contacts the lower core 36C.

A second embodiment according to the present invention will now be described with reference to the drawings. The differences from the first embodiment will mainly be discussed.

In this embodiment, when the exhaust valve 1 is controlled to follow the dynamic property of the reference model shown in FIG. 2, the convergence of the actual state quantity on the state quantity of the reference model is controlled by the sliding mode control. This control will hereinafter be described.

First, the physical model of the actual exhaust valve 1 is defined. The physical model is defined as a physical system that includes the elastic body including the lower spring 14 and the upper spring 24, the movable member including the exhaust valve 1 and connected to the elastic body, the frictional resistance between the movable member and the stationary member supporting the movable member, parts, the electromagnetic force acting on the armature 34, and the external force applied to the movable member. The dynamic equation of the system is expressed as the following equation (c8), in which the weight M, the elastic coefficient K, the valve displaced amount x, and the attenuation coefficient C, which are discussed in the first embodiment, are used. In addition, the equation (c8) includes the external force f, and the electromagnetic force u applied to the armature 34 to cause the armature 34 to follow the dynamic property of the reference model.

$$M\cdot\ddot{x}=-K\cdot x-C\cdot\dot{x}+u+f \quad \text{(c8)} \qquad \text{(Equation 8)}$$

The equation (c8) is expressed as the following equation (c9) by using a matrix.

(Equation 9)

$$\dot{X} = A\cdot X + B\cdot u \qquad (c9)$$

$$A = \begin{pmatrix} 0 & 1 \\ -\frac{K}{M} & -\frac{C}{M} \end{pmatrix}$$

$$B = \begin{pmatrix} 0 \\ -\frac{1}{M} \end{pmatrix}$$

$$X = \begin{pmatrix} x \\ \dot{x} \end{pmatrix}$$

The dynamic equation of a physical system in which the state quantity of the exhaust valve 1 follows a predetermined reference model is expressed as the equation (c10).

(Equation 10)

$$\dot{X}m = Am \cdot X + Bm \cdot r \quad \text{(c10)}$$

$$X = \begin{pmatrix} x \\ \dot{x} \end{pmatrix}$$

In the equation (c10), the matrix Am, the vector Bm and the input r are set to express the physical system of a reference model having a desired characteristics. Particularly, the quadratic reference model section in the reference model of FIG. 2 is expressed by, for example, the following matrixes Am and Bm, which correspond to the above equation (c8) from which the term of the attenuation coefficient C and the term of the input u are removed.

(Equation 11)

$$AM = \begin{pmatrix} 0 & 1 \\ -\dfrac{Km}{Mm} & 0 \end{pmatrix} \quad Bm = \begin{pmatrix} 0 \\ 0 \end{pmatrix} \quad \text{(c11)}$$

The linear reference model section of the reference model shown in FIG. 2 is expressed by the following matrixes Am and Bm in which the rate of change of the moving speed of the valve body 2 is expressed by γ.

(Equation 12)

$$Am = \begin{pmatrix} \gamma & 0 \\ 0 & 0 \end{pmatrix} \quad Bm = \begin{pmatrix} 0 \\ 0 \end{pmatrix} \quad \text{(c12)}$$

Instead of using the equations (c11) or (c12), similar reference models may be expressed by appropriately setting the input r in the equation (c10).

In the equations (c9) and (c10), the deviation between the state quantity representing the dynamic property of the reference model and the actual state quantity of the exhaust valve 1 is expressed by a vector e (e=Xm−X). The vector e is set on the switching hyperplane so that the state quantity of the exhaust valve 1 follows the state quantity expressing the dynamic property of the reference model in a desired manner. The procedure for setting the switching hyperplane of this embodiment will now be described with reference to FIGS. 5(a) to 5(c).

Figure 5A:
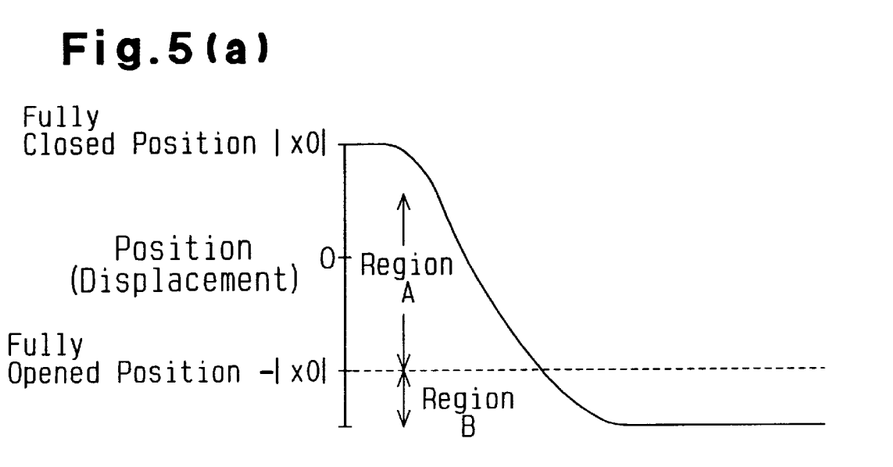
Figure 5B:
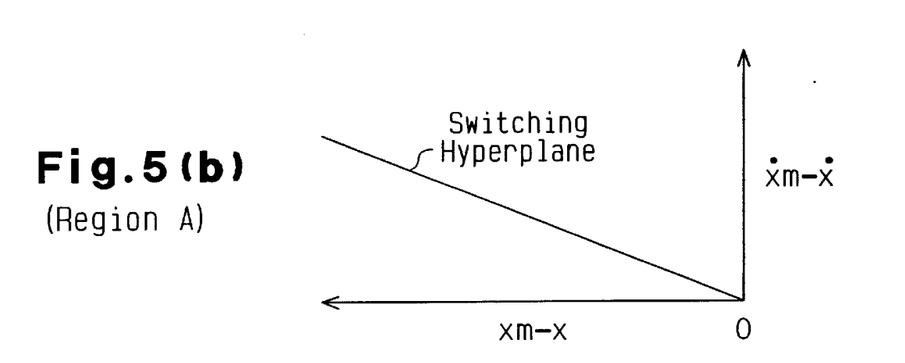
Figure 5C:
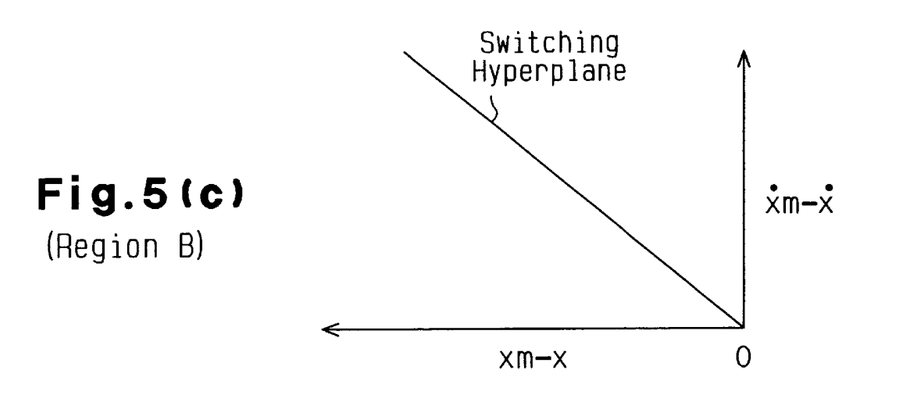

FIG. 5(a) shows a movement region A and a movement region B of the valve body 2. Switching hyperplanes set in the regions A and B are different from each other. FIG. 5(a) shows an example in which the valve body 2 is moved from the fully closed position to the fully opened position. The border between the region A and the region B is located in the vicinity of the fully opened position. The region at the side of the fully closed position is defined as the region A, and the region at the side of the fully opened position is defined as the region B. FIG. 5(b) shows a graph used for setting a switching hyperplane in the region A, and FIG. 5(c) shows a graph used for setting a switching hyperplane in the region B. As shown in FIGS. 5(b) and 5(c), the inclination of the time differential of the deviation xm−x in relation to the deviation xm−x in the region B is set greater than that in the region A. This increases the speed of convergence on the origin of a switching hyperplane in the vicinity of the fully opened position, where the performance of the electromagnetic force that attracts the armature 34 is increased. Therefore, the speed of convergence on the reference model is increased in the vicinity of the fully opened position.

Data regarding the switching functions for defining the switching hyperplanes corresponding to the regions A and B are stored in the ECU 40.

The procedure for setting the electromagnetic force applied to the armature 34 will now described. The electromagnetic force is set such that the state quantity of the exhaust valve 1 follows the dynamic property of the reference model.

Based on the equations (c9) and (c10), the time differential e of the vector e is expressed as follows.

(Equation 13)

$$\begin{aligned} \dot{e} &= \dot{X}m - \dot{X} = Am \cdot Xm - A \cdot X + Bm \cdot r - B \cdot u - f \\ &= Am(Xm - X) + (Am - A)X + Bm \cdot r - B \cdot u - f \\ &= Am \cdot e + (Am - A) + Bm \cdot r - B \cdot u - f \end{aligned} \quad \text{(c13)}$$

The switching function σ is defined as S·e (σ=S·e). Since the time differential of the switching function σ is zero in the sliding mode state, the following equation is satisfied.

$$\dot{\sigma} = S\dot{e} = S\{Am \cdot e + (Am-A)X + Bm \cdot r - B \cdot u - f\} = 0 \quad \text{(c14)} \quad \text{(Equation 14)}$$

Therefore, the input in the sliding mode state (sliding mode input) is expressed by the following equation (c15).

$$u = (SB)^{-1} S\{Am \cdot e + (Am-A)X + Bm \cdot r - f\} \quad \text{(c15)} \quad \text{(Equation 15)}$$

In the equation (c15), the sliding mode input Ul is set by using the equations (c9) and (c11) and the switching hyper plane shown in FIG. 5 and by setting the external force f to zero. Since the external force f varies according to the running state of the engine, the sliding mode input Ul is determined without factoring in the external force f. The influence of the external force f is absorbed by the reaching mode input.

The following constraints are added to setting of the switching hyperplanes so that the actual state quantity is converged on the state quantity representing the dynamic properties of the reference model.

First, the equation (c15) is substituted into the equation (c14) to obtain the following equation (c16).

$$\dot{e} = \{I - B(SB)^{-1}S\}\{Am \cdot e + (Am-A)X + Bm \cdot r - f\} \quad \text{(c16)} \quad \text{(Equation 16)}$$

The matching conditions Am−A=B·K1, Bm=B·K2, f=B·K3 are substituted into the equation (c16) to obtain the following equation (c17).

$$\dot{e} = \{I - B(SB)^{-1}S\}Am \cdot e \quad \text{(c17)} \quad \text{(Equation 17)}$$

In the equation (c17), if the switching function (switching matrix S) is set such that the vector e, or the coefficient matrix of the deviation e of the state quantity, is stabilized, the deviation e converges on zero.

The opening operation of the exhaust valve 1 of this embodiment will now be described with reference to FIG. 6.

Figure 6:
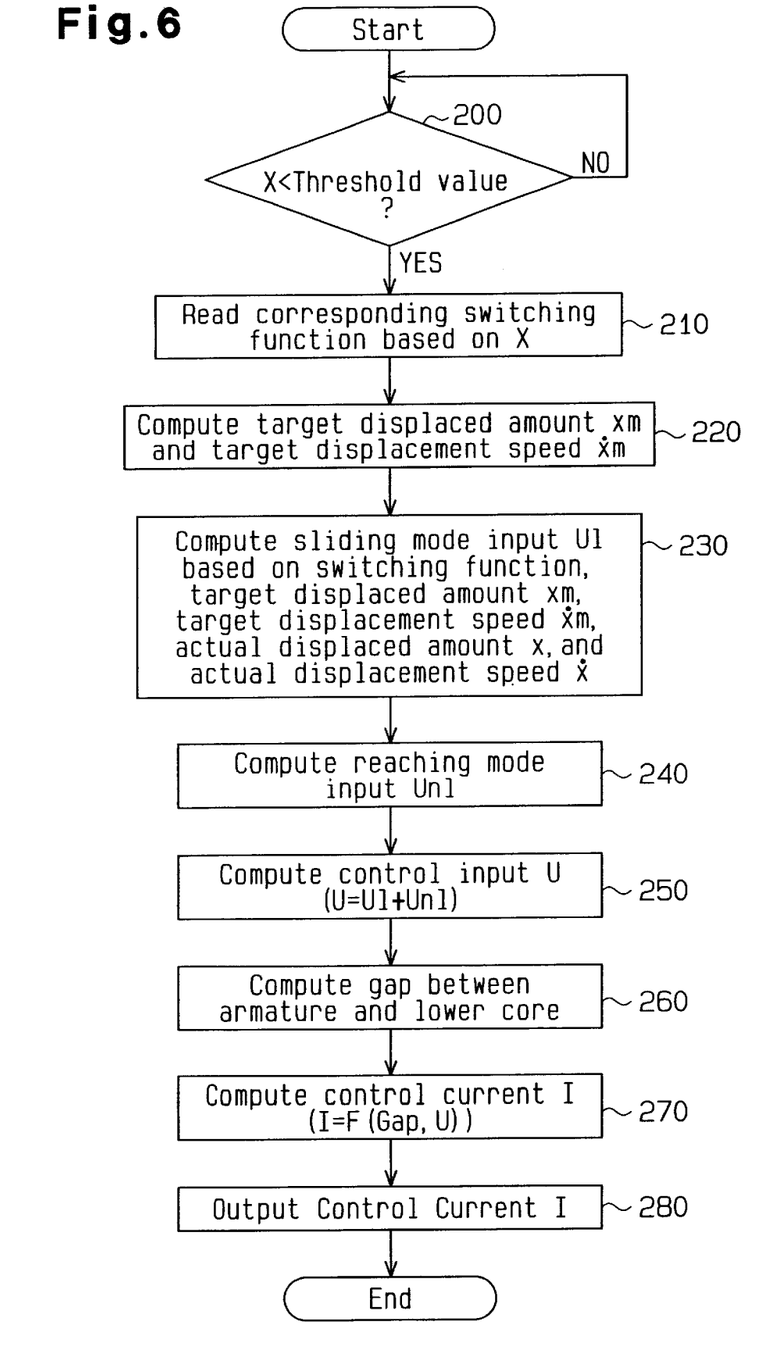
FIG. 6 is a flowchart showing a procedure for controlling the exhaust valve according to the second embodiment.

FIG. 6 is a flowchart showing the opening operation. This routine is repeatedly executed at predetermined intervals.

In step 200, ECU 40 judges whether the displacement amount x of the valve body 2 is equal to or less than a predetermined threshold value as in step 100 shown in FIG. 4. If the displacement is equal to less than the threshold value, the ECU 40 proceeds to step 210.

In step 210, the ECU 40 judges which of the regions A and B the displaced amount x of the valve body 2, which is detected by the displaced amount sensor 42, or the actual displaced amount x is in. The ECU 40 reads the switching function of the corresponding region from the memory.

In step S220, the ECU 40 computes a target displaced amount xm and a target displacement speed xm. The target displaced amount xm and the target displacement speed xm are included in the state quantity that represent the dynamic properties of the reference model in the current routine. The target state quantity is computed based on the time that has elapsed from when the opening control was started or from when the exhaust valve 1 started being displaced to the current routine. The computation may be performed in the ECU 40 based on the equation (c10). Alternatively, the ECU 40 may have a function to store a map defining the values of the target state quantity for each predetermined sampling time.

In step 230, referring to the switching function, the target displaced amount xm and the target displacement speed xm, and the actual displaced amount x and the actual displacement speed xm, the ECU 40 computes the sliding mode input Ul by using to the equation (c15).

In step 240, the ECU 40 computes the reaching mode input Unl using the equation (c6) by referring to the switching function read in step 210. As in the procedure of steps 140 to 170 shown in FIG. 4, the ECU 40 performs steps 250 to 280, and temporarily suspends the routine.

The above described embodiment has the following advantages.

(4) In the model reference adaptive control, the deviation between the state quantity representing the dynamic properties of the reference model and the actual state quantity is prevented from leaving the switching hyperplane. The switching hyperplane is varied in accordance with the displaced amount (moved amount) of the valve body 2. This permits the convergence of the actual state quantity of the valve body 2 on the dynamic properties of the reference model to be varied in accordance with the displaced amount of the valve body 2. Therefore, the current to the exhaust valve 1 can be controlled by factoring in the fact that forces acting on the exhaust valve 1 by the upper and lower springs 24, 14, the opening and closing electromagnets 36, 38 vary according to the moved position of the valve body 2.

A third embodiment according to the present invention will now be described with reference to the drawings. The differences from the first and second embodiments will mainly be discussed.

In the above embodiment, the feedback gain G of the reaching mode input (feedback input) Unl expressed by the equation (c6) is a constant. In this embodiment, the gain G varies based on the engine speed NE, the engine load Q and the displaced amount x of the valve body 2. That is, since the disturbance acting on the valve body 2 increases as the engine speed NE and the engine load Q increase, the gain G is increased for greater values of the engine speed NE and the engine load Q. Since the force of the upper and lower springs 24, 14 urging the valve body 2 in the closing direction increases in the vicinity of the fully opened position, the gain G is increased to increase the force that moves the valve body 2 toward the fully opened position.

Figure 7:
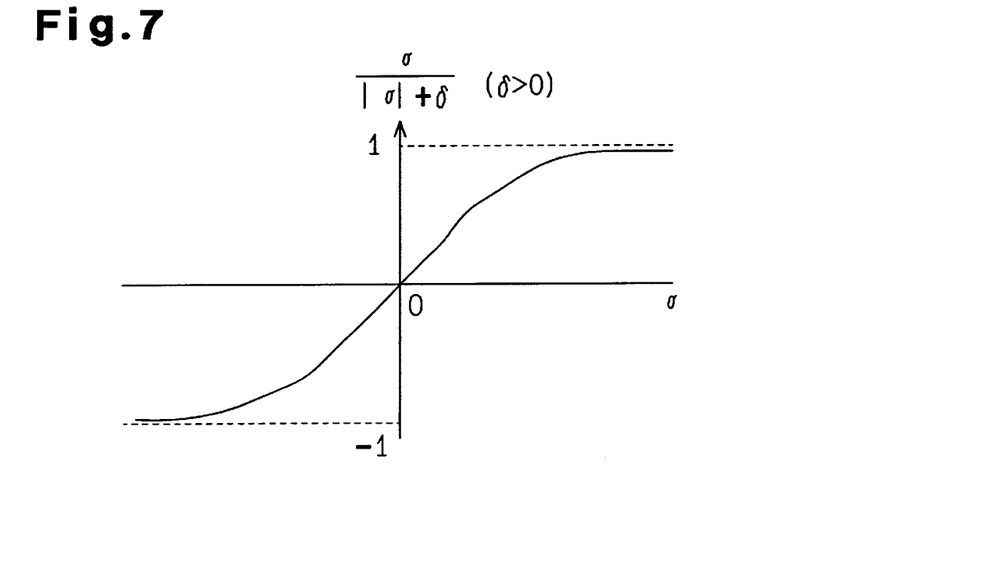
FIG. 7 is a graph for setting a reaching mode input according to a third embodiment, in which a sliding mode controlling apparatus according to the present invention is applied to a valve controlling apparatus of an engine.

In this embodiment, when the actual state quantity of the exhaust valve 1 is in the vicinity of the switching hyperplane, the reaching mode input Unl, which causes the state quantity of the exhaust valve 1 to reach the switching hyperplane, is set smaller compared to a case when the actual state quantity is in another region. This switches the achieving mode input Unl between a region where the switching function has a positive value and a region where the switching function has a negative value. This prevents the actual state quantity of the exhaust valve 1 from generating high frequency vibrations in the vicinity of the switching hyperplane, or from chattering. Specifically, a smoothing function as shown in FIG. 7 is used in this embodiment.

The reaching mode input Unl of this embodiment is expressed by the following equation (c18).

(Equation 18)

$$Unl = G(NE, Q, x) \cdot \frac{\sigma}{|\sigma| + \delta} \quad (c18)$$

$$\delta > 0$$

This embodiment has the following advantages.

(5) The gain G of the reaching mode input Unl is set to be varied in accordance with the engine speed, the engine load and the displaced amount (moved position) of the valve body 2. The control is therefore performed by factoring in the facts that the external force acting on the valve body 2 such as the internal cylinder pressure is changed according to the running state of the engine, and that the electromagnetic force acting on the armature 34 and the force of the upper and lower springs 24, 14 acting on the exhaust valve 1 are changed according to the moved position of the displacement.

(6) The reaching mode input Unl is set smaller when the actual state quantity of the exhaust valve 1 is in the vicinity of the switching hyperplane than when the actual state quantity is in other regions. This suppresses chattering.

The above embodiments may be modified as follows.

In FIGS. 5(a) to 5(c), two switching hyperplanes are set according to the moved position of the valve body 2. However, the number of the hyperplanes may be three or more.

Figure 8:
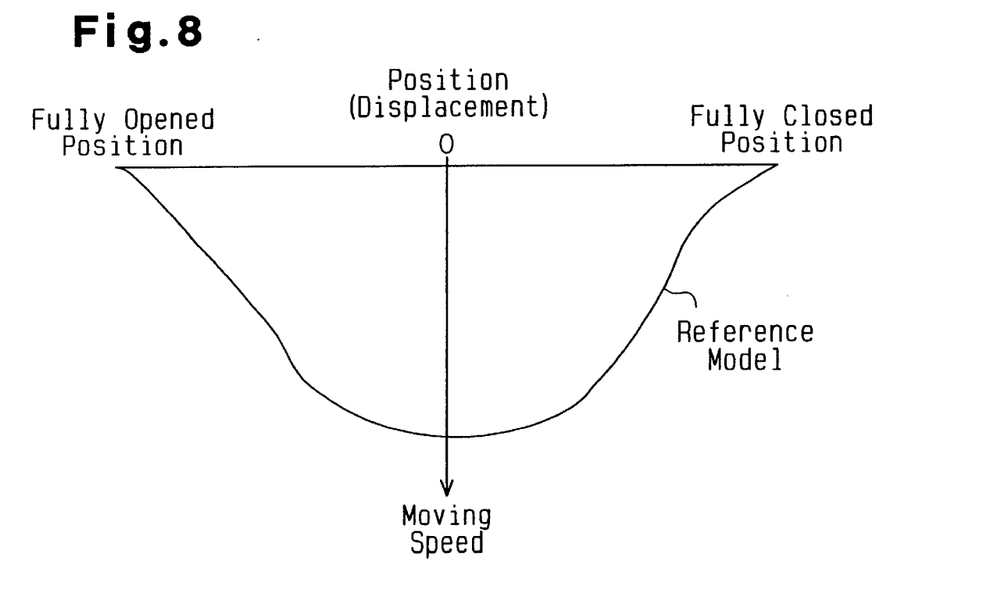
FIG. 8 is a graph showing a reference model used in a modification of the first to third embodiments.

The reference model may be set in a manner other than that shown in FIG. 2. For example, as shown in FIG. 8, the reference model may be set according to transitions of the state quantity of the valve body 2 based on the assumption that there is no external forces, factors limiting movement of the valve body 2 (for example, frictional force), or electromagnetic forces. In other words, the reference model may be set based on the assumption that the state quantity of the valve body 2 is changed only by the urging forces of the upper and lower springs 24, 14.

Figure 9:
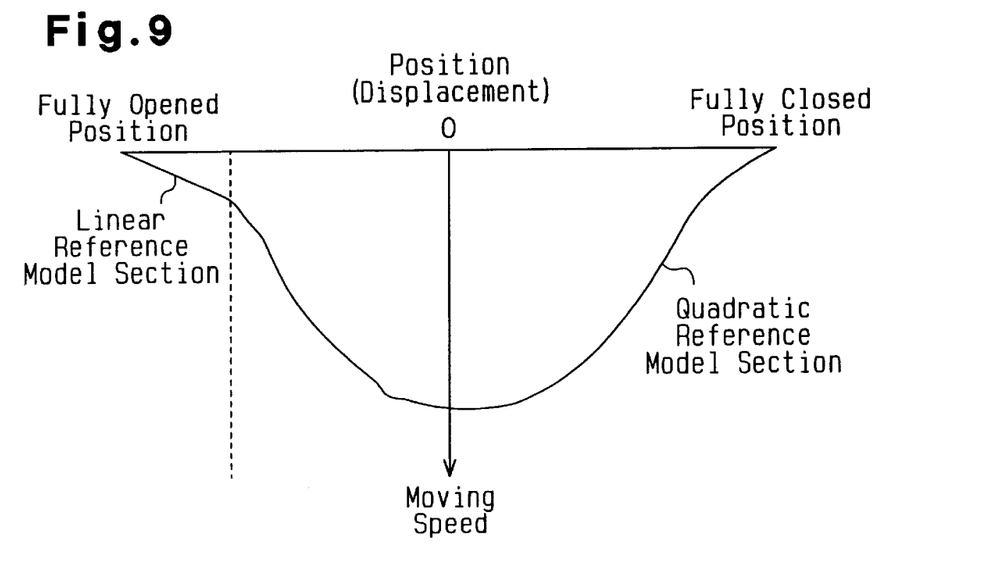
FIG. 9 is a graph showing a reference model used in another modification of the first to third embodiments.

The quadratic reference model section may be different from the one shown in FIG. 2. That is, the quadratic reference model section may be set in any manner as long as the section is set according to transitions of the state quantity of the valve body 2 based on the assumption that there is no external force such as electromagnetic force or internal cylinder pressure. For example, when setting the quadratic reference model section, the term related to the attenuation coefficient C in the equation (c8) may be considered. FIG. 9 shows a modification of reference model having a quadratic reference model section and a linear reference model section. In the region except for the vicinity of the fully opened position of the valve body 2, the quadratic reference model section is set by factoring in the urging forces of the upper and lower springs 24, 14 and the term related to the attenuation coefficient C. At the fully opened position of the valve body 2 and in the vicinity of the fully opened position, the linear reference model section as shown in FIG. 2 is set.

In the third embodiment, in the region of the state quantity of the exhaust valve 1 where the reaching mode input Unl has a positive value, the reaching mode input Unl may be set small at least in a region where the switching hyperplane is zero and the adjacent regions. This prevents the control input U from having a negative value when the actual state quantity of the exhaust valve 1 is controlled onto the switching hyperplane.

The exhaust valve 1 shown in FIG. 1 is controlled when the opening electromagnet 36 generates a force that attracts the armature 34. That is, the control input U shown in FIGS. 4 and 6 is generated by the electromagnetic force of the opening electromagnet 36 acting on the armature 34. When the control input U has a negative value, a force toward the fully closed position needs to be applied to the armature 34. However, when supplied with current in the normal state, the opening electromagnet 36 applies a force toward the fully opened position to the armature 34. Therefore, when the control input U has a negative value, the control current I is set to zero. However, in this embodiment, the control input U is prevented from having a negative value. Thus, the exhaust valve 1 is favorably controlled based on electromagnetic force.

A fourth embodiment according to the present invention will now be described with reference to the drawings. The differences from the first to third embodiments and their modifications will mainly be discussed.

In the above embodiments and their modifications, controls when moving the valve body 2 from the fully closed position to the fully opened position are described. However, in this embodiment, the valve body 2 is moved from the fully closed position to a position immediately before the fully opened position. Also, a control for retaining (fixing) the valve body 2 immediately before the valve body 2 reaches the fully opened position is executed. Accordingly, the position of the armature 34 is fixed immediately before the armature 34 contacts the lower core 36C. Therefore, shock and noise generated by contact of the armature 34 with the lower core 36C are prevented. Since the armature 34 does not contact the lower core 36C when the exhaust valve 1 is opened, the durability of the armature 34 and the lower core 36C is improved.

Figures 10A, 10B, 10C:
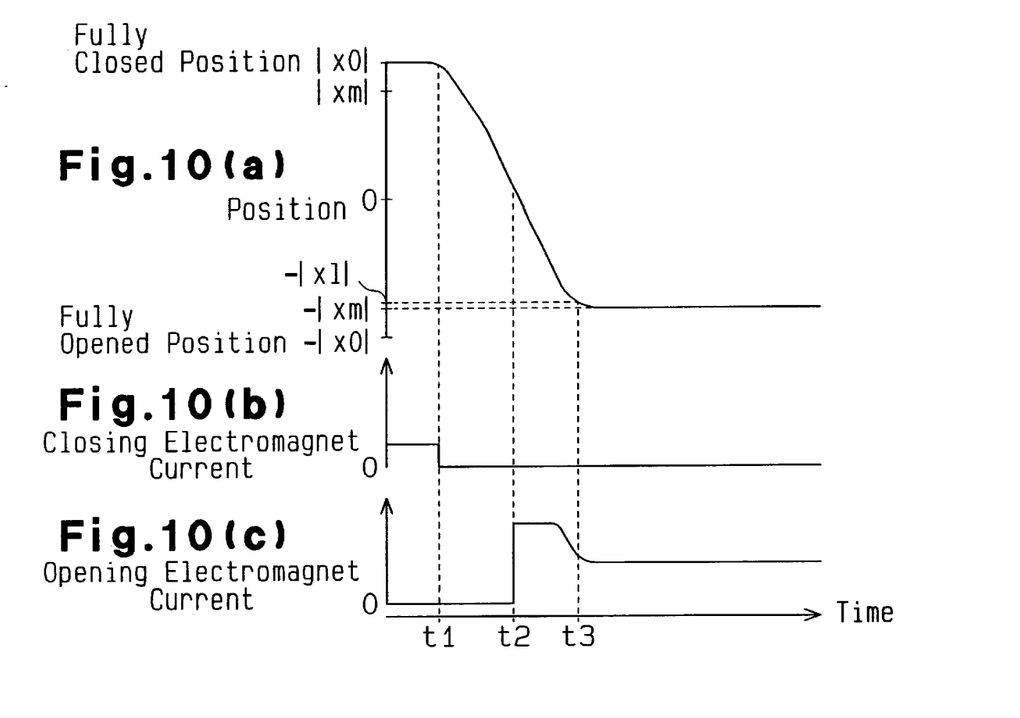

FIGS. 10(*a*) to 10(*c*) show the control of the exhaust valve 1 according to this embodiment. FIG. 10(*a*) is a time chart showing an example of movement of the valve body 2 when the valve body 2 is moved fully closed position (x0) to a movement end (−xm) close to the fully opened position (−x0). FIG. 10(*b*) shows the current supplied to the closing electromagnet 38. FIG. 10(*c*) shows the current supplied to the opening electromagnet 36. The retaining current for retaining the valve body 2 at the fully closed position (x0) is stopped being supplied to the closing electromagnet 38 at time t1. Then, the valve body 2 is moved toward to the fully opened position. From time t2, the current to the opening electromagnet 36 is controlled such that the armature 34 is attracted to the opening electromagnet 36. When the valve body 2 reaches a retaining control starting position (−x1), which is slightly before the movement end (−xm), at time t3, the retaining current for retaining the valve body 2 at the movement end (−xm) is supplied to the opening electromagnet 36.

Figure 11:
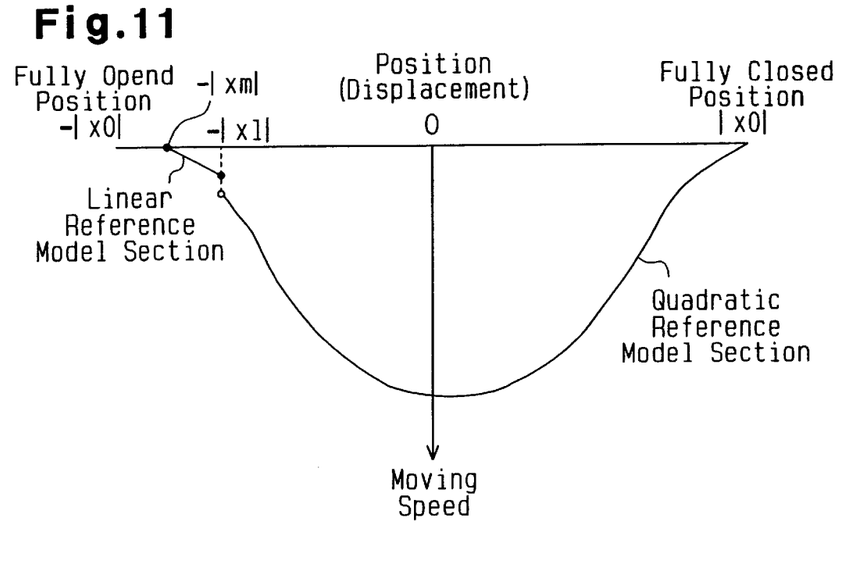
FIG. 11 is a graph showing the reference model used in the fourth embodiment.

In this embodiment, a reference model shown in FIG. 11 is used for the control. That is, the reference model includes a quadratic reference model section and a linear reference model section. The quadratic reference model section corresponds to a movement region of the valve body 2 from the fully closed position (x0) to the retaining control starting position (−x1). The linear reference model section corresponds to a movement region of the valve body 2 from the retaining control starting position (−x1) to the movement end (−xm). Like the quadratic reference model section shown in FIG. 9, the quadratic reference model section of this embodiment is set by factoring in the urging forces of the upper and lower springs 24, 14 and the term related to the attenuation coefficient C. The linear reference model section of this embodiment is set in the same manner as the linear reference model section shown in FIG. 2. In the linear reference model section of FIG. 11, the moving speed of the valve body 2 is set to zero at the movement end (−xm), which is before the fully opened position (x0).

The opening control of the exhaust valve 1 in this embodiment is performed in the same manner as the second embodiment. That is, when the exhaust valve 1 is controlled, or the model reference adaptive control is performed, so that the exhaust valve 1 follows the dynamic property of the reference model shown in FIG. 11, the convergence of the actual state quantity on the state quantity of the reference model is controlled by the sliding mode control. Alternatively, as in the first embodiment, the sliding mode control may be performed by setting a hyperplane that contacts a portion of the reference model corresponding to the moved position of the valve body 2 to the switching hyperplane corresponding to the current moved position.

In this embodiment, the reference model is not limited to the one shown in FIG. 11, as long as the moving speed of the valve body 2 is zero at the movement end (−xm). For example, like the quadratic reference model section shown in FIG. 2, the quadratic reference model section of this embodiment may be set according to transitions of the state quantity of the valve body 2 determined only by the urging forces of the upper and lower springs 24, 14.

This embodiment has the following advantages.

(7) Since the exhaust valve 1 is retained at a movement end set before the fully opened position, the armature 34 is prevented from contacting the lower core 36C. Therefore, shock and noise generated by contact of the armature 34 with the lower core 36C are prevented. Also, the durability of the armature 34 and the lower core 36C is improved.

The fourth embodiment may be modified as follows.

Figures 12A, 12B, 12C:
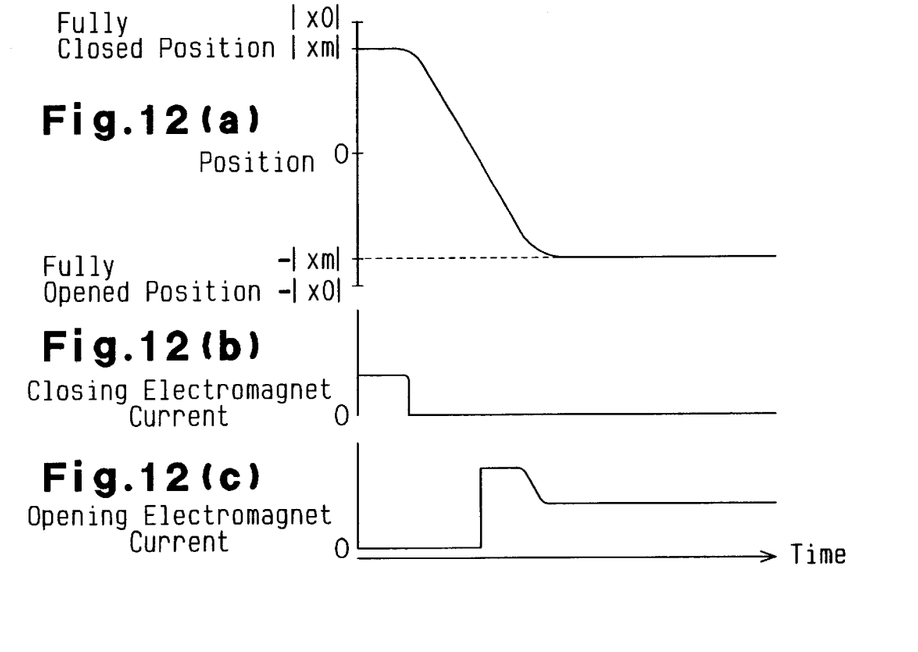

For example, the exhaust valve 1 may be controlled in the manner shown in FIGS. 12(*a*) to 12(*c*). In FIG. 12(*a*), a position (xm) is a position at which the valve body 2 contacts the valve seat 16, or the fully closed position of the valve body 2. A position (x0) beyond the fully closed position (xm) is a position at which the armature 34 contacts the upper core 38C. That is, the exhaust valve 1 is designed such that the armature 34 does not contact the upper core 38C when the valve body 2 is at the fully closed position (xm). Therefore, noise produced by collision between the armature 34 and the upper core 38C is prevented.

Figures 13A, 13B, 13C:
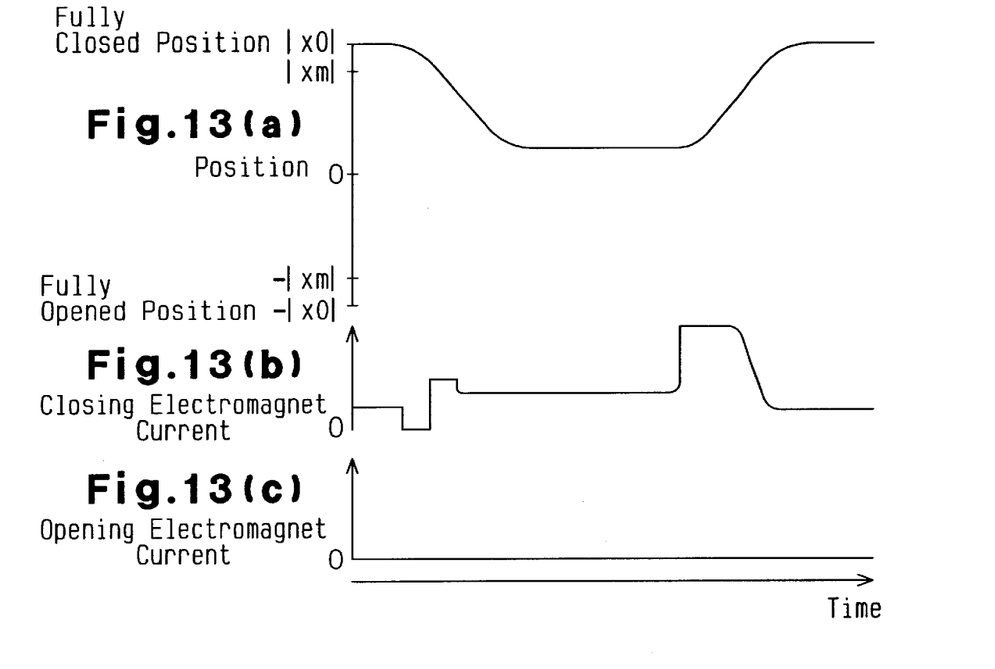

As shown in FIGS. 13(*a*) to 13(*c*), control for varying the lift amount of the valve body 2 may be executed. FIGS. 13(*a*) to 13(*c*) show an example in which the valve body 2 is retained at a position that is closer to the fully closed position than the reference position. In this case, the sliding mode control is performed by the force of the closing electromagnet 38 that attracts the armature 34.

The above embodiments may be modified as follows.

When opening the exhaust valve 1, the attracting force of the closing electromagnet 38 acting on the armature 34 may be used in addition to the attracting force of the opening electromagnet 36 acting on the armature 34.

The gain that satisfies the reaching condition is set by using Liapunov function in the above embodiments. However, the gain may be set by using other methods, for example, reaching law method. Also, the reaching mode input may be different from the ones expressed by the equations (c6) or (c18).

Figure 14:
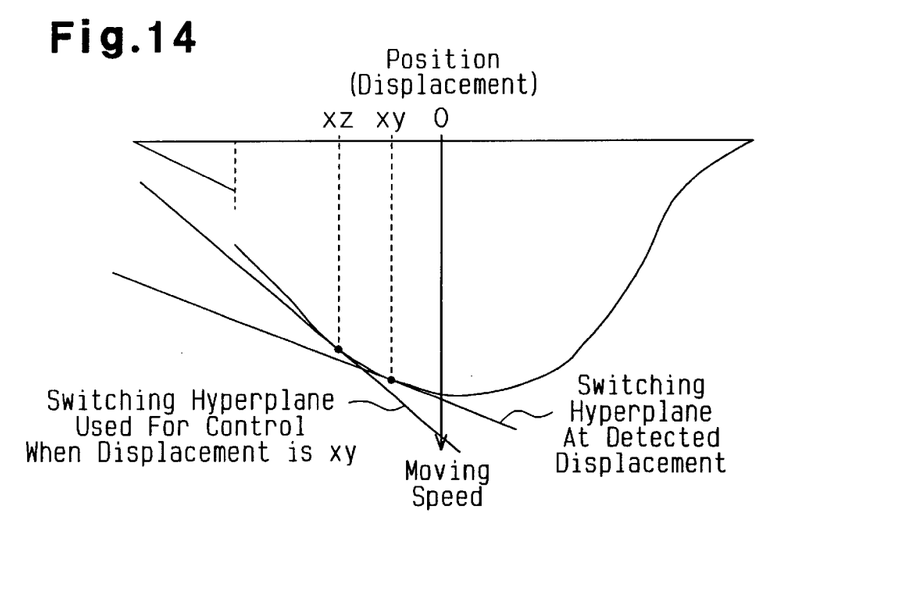
FIG. 14 is a graph showing a further modification of the first to fourth embodiments.

In the above embodiments, the valve body 2 is controlled such that the state quantity of the valve body 2 converges on the switching hyperplane defined by each moved position of the valve body 2. However, the valve body 2 may be controlled such that the state quantity converges on a switching hyperplane corresponding to a position that is closer to the fully opened position than the current position of the valve body 2. FIG. 14 schematically shows a modification of the first embodiment. In this modification, the sliding mode control is performed by using a switching hyperplane at a displacement point xz that is later than the detected displacement xy of the valve body 2 by a predetermined amount. For example, in the procedure of FIG. 4, a predetermined displaced amount Δx may be added to the detected actual displaced amount xy and the resultant of the addition may be used in steps 110 to 140. Accordingly, a control factoring in response delay of electromagnetic force is executed.

The sliding mode input may be computed by factoring in the external force acting on the valve body 2. In the exhaust valve 1, for example, the external force acting on the valve body 2 can be computed in accordance with the difference between the internal cylinder pressure and the exhaust pressure. In an intake valve, the external force acting on the valve body can be computed in accordance with the difference between the internal cylinder pressure and the intake pressure. The internal cylinder pressure, the exhaust pressure and the intake pressure may be actually detected. Alternatively, the pressures may be estimated based on other detectable state quantity. For example, the external force f may be removed from the equation (c8) to form a spring mass vibration model that simulates the opening and closing of the valve body 2. In this case, the inner state of the engine is observed based on the formed model. This permits the external force f to be estimated based on the detectable state quantity.

The engine valve is not limited to the one shown in FIG. 1. For example, a permanent magnet may be located in each of the electromagnets 36, 38, and the valve body 2 may be retained at movement ends by the magnetic force of the permanent magnets. When the valve body 2 retained at one of the movement ends by the corresponding permanent magnet is moved toward the other movement end, flux of a direction opposite to the flux direction of the retaining permanent magnet is generated in the corresponding electromagnet 36, 38, so that the flux of the retaining permanent magnet is cancelled. In this structure, the reference model based on transitions of the valve body 2 by the forces of the upper and lower springs 24, 14 may be set as in the illustrated embodiments and the modifications thereof. For example, when setting the reference model, the term related to the attenuation coefficient C in the equation (c8) need not be necessarily considered.

The lower spring 14 and the upper spring 24 may be replaced with other type of elastic members as necessary. One of the elastic members that urges the exhaust valve 1 toward one of the displacement ends may be omitted. Instead of attracting force, repulsive force may be produced between an armature and an electromagnet to drive the exhaust valve 1.

The displaced amount (moved position) of the discharge valve 1 may be detected by means other than the above described displaced amount sensor. For example, the displaced amount may be detected by a sensor that detects the speed of the valve body 2, the valve shaft 4, or the armature 34. In this case, the valve displaced amount (moved position) is obtained by performing integration of the detected speed.

Without using the reference model, the switching hyperplane may be varied in accordance with the displaced amount of the valve body 2 as necessary.

The present invention may be applied to a control other than the control of engine valves. Particularly, the present invention is effective when applied to a control in which the state quantity of a subject is controlled to converge on a switching hyperplane when the subject is urged by an elastic member from one movement end to another movement end. The movement region of the controlled subject when the subject is displaced from one movement end to the other movement end need not be a one-dimension space. The dynamic equation of the physical system, the reference model, and the control input are not limited to ones that can be expressed by linear functions.

Therefore, the present examples and embodiments are to be considered as illustrative and not restrictive and the invention is not to be limited to the details given herein, but may be modified within the scope and equivalence of the appended claims.

What is claimed is:

1. A sliding mode controlling apparatus for a controlled subject urged by an elastic member, wherein the controlled subject is movable between two movement ends, wherein, when the controlled subject is moved from a first movement end, which is one of the movement ends, to a second movement end, which is the other one of the movement ends, the controlling apparatus controls the controlled subject such that the state quantity of the controlled subject converges on a previously set switching hyperplane, the controlling apparatus comprising:

changing means, wherein the changing means changes the switching hyperplane in accordance with the position of the controlled subject.

2. The controlling apparatus according to claim 1, wherein a reference model representing transitions of the state quantity of the controlled subject is previously set, and wherein the changing means sets, as the switching hyperplane, a hyperplane contacting a portion of the reference model that corresponds to the position of the controlled subject.

3. The controlling apparatus according to claim 2, wherein the state quantity includes the position and the moving speed of the controlled subject, and wherein the reference model represents the relationship between the position and the moving speed of the controlled subject.

4. The controlling apparatus according to claim 2, wherein the controlling apparatus defines the switching hyperplane in relation to the deviation between a target state quantity representing the dynamic properties of the reference model and the actual state quantity of the controlled subject, thereby causing the controlled subject to follow the dynamic properties of the reference model.

5. The controlling apparatus according to claim 2, wherein the reference model is set based on transitions of the state quantity of the controlled subject defined by the urging force of the elastic member.

6. The controlling apparatus according to claim 5, wherein the reference model is set as a hyperplane in the vicinity of the second movement end.

7. The controlling apparatus according to claim 5, wherein the reference model includes a quadratic reference model section represented by a quadratic curve and a linear reference model section represented by a straight line of a linear function, wherein the quadratic reference model section corresponds to a region of the movement range of the controlled subject from the first movement end to a position in the vicinity of the second movement end, and wherein the linear reference model section corresponds to the remaining region of the movement range of the controlled subject.

8. The controlling apparatus according to claim 7, wherein, in the movement region corresponding to the linear reference model section, the rate of change of the moving speed of the controlled subjected represented by the linear reference model section is less than the rate of change of the moving speed of the controlled subject determined only by the urging force of the elastic member.

9. The controlling apparatus according to claim 2, wherein the movement range of the controlled subject is divided into a plurality of movement regions, and wherein the reference model is derived from a physical property of the controlled subject that varies from one movement regions to another.

10. The controlling apparatus according to claim 2, wherein the controlling apparatus controls the controlled subject such that the state quantity of the controlled subject converges on a switching hyperplane that corresponds to a position that is closer to the second movement end than the current position of the controlled subject.

11. The controlling apparatus according to claim 1, wherein, when the state quantity of the controlled subject is in a region in the vicinity of the switching hyperplane, the controlling apparatus decreases a force required for causing the state quantity of the controlled subject to reach the switching hyperplane compared to a case where the state quantity is in another region.

12. The controlling apparatus according to claim 1, wherein the controlled subject is a valve of an internal combustion engine, and wherein the valve includes a valve body and an electromagnetic actuator for electromagnetically actuating the valve body.

13. The controlling apparatus according to claim 12, wherein the electromagnetic actuator includes an armature coupled to the valve body, and a pair of electromagnets between which the armature is located, and wherein each electromagnet generates electromagnetic force for attracting the armature.

14. The controlling apparatus according to claim 13, further comprising setting means for setting a feedback gain for causing the state quantity of the valve body to reach the switching hyperplane, and wherein the setting means changes the feedback gain according to at least one of the rotation speed of the engine, the engine load, and the position of the valve body.

15. A sliding mode controlling apparatus for a movable member urged by an elastic member, wherein the movable member is moved between two movement ends by an electromagnetic actuator, the apparatus comprising:

a controller, wherein, when the movable member is moved from a first movement end, which is one of the movement ends, to a second movement end, which is the other one of the movement ends, the controller controls the electromagnetic actuator such that the state quantity of the movable member converges on a previously set switching hyperplane, and wherein the controller changes the switching hyperplane in accordance with the position of the movable member.

16. A sliding mode control method for a controlled subject urged by an elastic member, wherein the controlled subject is movable between two movement ends, the method comprising:

controlling the controlled subject such that the state quantity of the controlled subject converges on a previously set switching hyper plane when the controlled subject is moved from a first movement end, which is one of the movement ends, to a second movement end, which is the other one of the movement ends; and changing the switching hyperplane in accordance with the position of the controlled subject.

17. The method according to claim 16, further comprising setting a reference model representing transitions of the state quantity of the controlled subject, and wherein the switching of the hyperplane includes setting, as the switching hyperplane, a hyperplane contacting a portion of the reference model that corresponds to the position of the controlled subject.

18. The method according to claim 17, further comprising defining the switching hyperplane in relation to the deviation between target the state quantity representing the dynamic properties of the reference model and the actual the state quantity of the controlled subject, thereby causing the controlled subject to follow the dynamic properties of the reference model.

19. The method according to claim 17, wherein the reference model is set based on transitions of the state quantity of the controlled subject defined by the urging force of the elastic member.

20. The method according to claim 19, wherein the reference model includes a quadratic reference model section represented by a quadratic curve and a linear reference model section represented by a straight line of a linear function, wherein the quadratic reference model section corresponds to a region of the movement range of the controlled subject from the first movement end to a position in the vicinity of the second movement end, and wherein the linear reference model section corresponds to the remaining region of the movement range of the controlled subject.

21. The method according to claim 20, wherein, in the movement region corresponding to the linear reference model section, the rate of change of the moving speed of the controlled subjected represented by the linear reference model section is less than the rate of change of the moving speed of the controlled subject determined only by the urging force of the elastic member.

22. The method according to claim 17, further comprising controlling the controlled subject such that the state quantity of the controlled subject converges on a switching hyperplane that corresponds to a position that is closer to the second movement end than the current position of the controlled subject.

23. The method according to claim 16, further comprising, when the state quantity of the controlled subject is in a region in the vicinity of the switching hyperplane, decreasing a force required for causing the state quantity of the controlled subject to reach the switching hyperplane compared to a case where the state quantity is in another region.

* * * * *